US007756055B2

United States Patent
Hulbert

(10) Patent No.: US 7,756,055 B2
(45) Date of Patent: Jul. 13, 2010

(54) METHOD OF TRANSMISSION

(75) Inventor: Anthony Peter Hulbert, Southampton (GB)

(73) Assignee: Roke Manor Research Limited, Romsey (GB)

( * ) Notice: Subject to any disclaimer, the term of this patent is extended or adjusted under 35 U.S.C. 154(b) by 501 days.

(21) Appl. No.: 11/797,488

(22) Filed: May 3, 2007

(65) Prior Publication Data

US 2007/0258403 A1    Nov. 8, 2007

(30) Foreign Application Priority Data

May 5, 2006    (GB)    ................... 0608898.3
Apr. 18, 2007    (GB)    ................... 0707392.7

(51) Int. Cl.
*H04J 1/16* (2006.01)

(52) U.S. Cl. .................. 370/252; 370/231; 370/328

(58) Field of Classification Search .................. None
See application file for complete search history.

(56) References Cited

U.S. PATENT DOCUMENTS

| 2003/0207699 | A1 | 11/2003 | Shpak | |
| 2005/0058151 | A1* | 3/2005 | Yeh ........................... | 370/445 |
| 2005/0143125 | A1* | 6/2005 | Maltsev et al. ............. | 455/557 |
| 2005/0239411 | A1* | 10/2005 | Hazra et al. ............. | 455/67.11 |
| 2008/0186938 | A1* | 8/2008 | Okazaki .................... | 370/343 |

FOREIGN PATENT DOCUMENTS

| GB | 2 407 005 A | 4/2005 |
| WO | WO 2005/101768 A1 | 10/2005 |
| WO | WO 2006/120652 A2 | 11/2006 |
| WO | WO 2006/132328 A1 | 12/2006 |

OTHER PUBLICATIONS

European Search Report dated Apr. 16, 2008 (one (1) page).
Great Britain Search Report dated Aug. 13, 2007 (one (1) page).

\* cited by examiner

*Primary Examiner*—Huy D Vu
*Assistant Examiner*—James P Duffy
(74) *Attorney, Agent, or Firm*—Crowell & Moring LLP

(57) ABSTRACT

A method of transmission comprises receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference. A second source determines whether it has received the transmission from the first source, or the acknowledgement from the first destination, at a power level lower than that of the maximum permitted additional interference given in the indication; and if so, the second source sends a transmission to a second destination, which at least partially overlaps in time, communication between the first source and first destination.

25 Claims, 3 Drawing Sheets

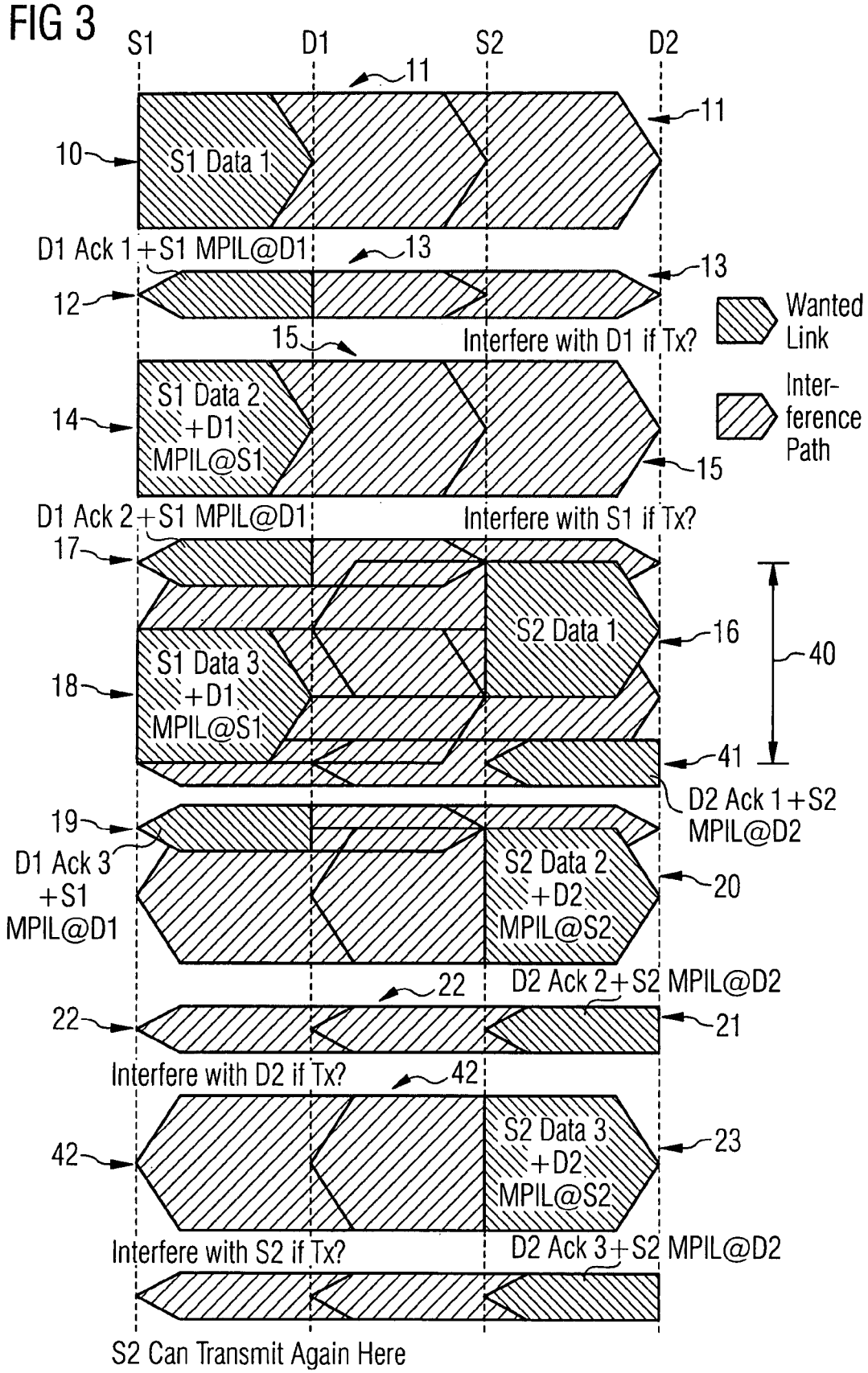

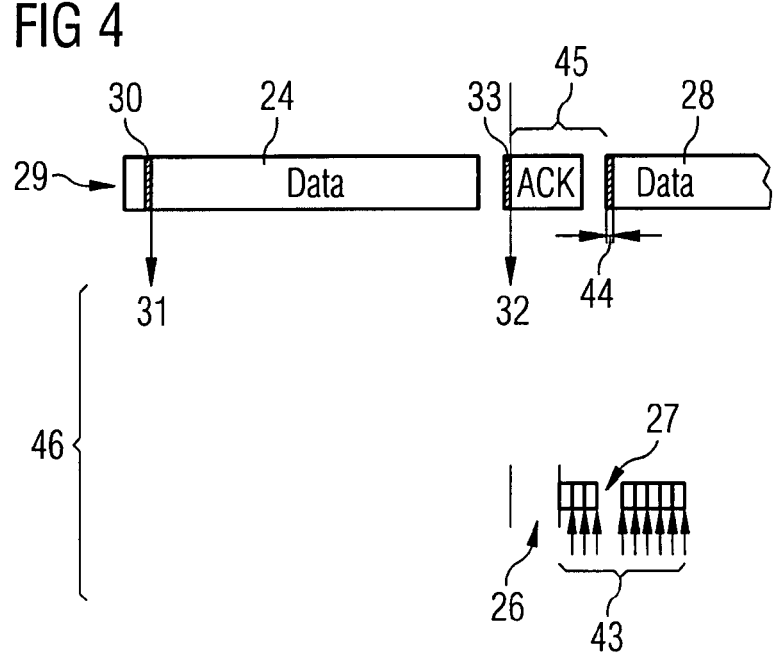
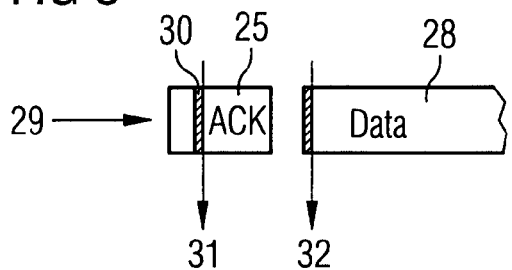
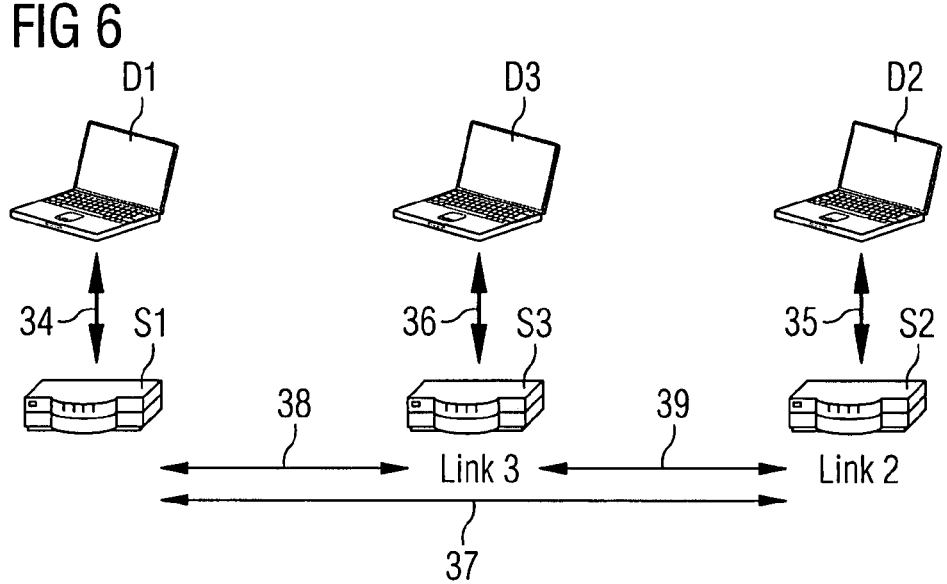

METHOD OF TRANSMISSION

BACKGROUND

This invention relates to a method of transmission, in particular for wireless local area networks (LAN).

Wireless LAN systems operate carrier sense multiple access (CSMA) protocol to facilitate multiple access by time sharing of a channel. The principle is to disallow transmission on a radio channel that is determined by reception to be busy, particularly with transmissions of the same type.

The problem with this protocol is that it prevents operation in particular scenarios where the generation of interference would be acceptable, for example where a victim receiver receives a signal that is strong enough to overcome that interference.

SUMMARY OF THE INVENTION

In accordance with a first aspect of the present invention, a method of transmission comprises receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference; wherein a second source determines whether it has received the transmission from the first source, or the acknowledgement from the first destination, at a power level lower than that of the maximum permitted additional interference given in the indication; and if so, the second source sends a transmission to a second destination, which at least partially overlaps in time, communication between the first source and first destination. This process treats the transmission containing the maximum permitted additional interference information as a form of receiver beacon in that the transmission indicates under what conditions the receiver is safe from interference. This technique is henceforth referred to as 'Transmissions as Receiver Beacons' or 'TARB'. Sharing of the spectrum using this mechanism when it would conflict with the requirements of normal CSMA is referred to as 'TARB sharing' and a transceiver that has received adequate information to allow it to transmit in these circumstances is said to be in the 'TARB state'. The added field in the transmissions that contain the maximum permitted additional interference (MPIL) and other related information, to be introduced later, is referred to as the 'TARB field'.

The present invention determines the level of the maximum permitted additional interference which can be received at the first destination whilst still retaining an acceptable probability of reception of transmissions from the first source at the first destination, then provides that information in a subsequent transmission, so that other pairs of source and destination can determine whether their transmissions will cause unacceptable interference or not, rather than having to assume that being able to hear any other transmission means that they must wait to transmit. The invention is not limited to only two sources and destinations and any reference to second can be read equally as a second or subsequent source or destination.

Preferably, the method further comprises determining from the acknowledgement an indication of maximum permitted additional interference at the first source and sending a further transmission from the first source to the first destination including an indication of the additional interference at the first source.

Preferably, the second source compares the power level of each received transmission containing an indication of with the level of maximum permitted additional inteference indicated in that transmission in order to determine whether or not to send an at least partially overlapping transmission to the second destination.

The transmission may comprise data communicated between the first source and the first destination and the acknowledgment may be an Acknowledgement message indicating safe receipt of the data, but in one example the transmission from the first source comprises a Request to Send message and the acknowledgement from the first destination comprises a Clear to Send message. Typically, these are sent before data transmissions begin.

Preferably, the maximum permitted additional interference at the first destination is determined from at least one of signal strength of the transmission, data rate of the transmission; and signal to interference ratio of the destination.

The source and destination require both transmit and receive functions, which can be provided by use of a transmitter and receiver at each position, but for additional economy by virtue of sharing at least some of their circuitry, preferably the sources and destinations comprise transceivers.

The maximum permitted additional interference is indicated in the acknowledgement and preferably, the level of additional interference is included in data of the acknowledgement.

It is assumed that all transmissions from any source or destination are made at the same power, but if any part of the system is operating power control, this may not be the case, so preferably, the method further comprises including in the acknowledgment an indication of the transmit power at the first destination Preferably, the maximum permitted power that the second source is permitted to transmit is equal to the power level at which the second source has received the acknowledgement from the first destination subtracted from the transmit power at the first destination included in the acknowledgment plus the power level of the maximum permitted additional interference given in the indication; and wherein the second source transmits at, or below the permitted maximum power, if sufficient, or refrains from transmitting, if not.

The second source determines the available power for transmission and if this is not sufficient, then it does not transmit.

Preferably, the method further comprises including in the acknowledgment an indication of the transmit power at the first source.

Preferably, the maximum permitted power that the second source is permitted to transmit is equal to the power level at which the second source has received the transmission from the first source subtracted from the transmit power at the first source included in the acknowledgment plus the power level of the maximum permitted additional interference given in the indication; and wherein the second source transmits at, or below the permitted maximum power, if sufficient, or refrains from transmitting, if not.

In accordance with a second aspect of the present invention, a method of transmission comprises receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference and the transmit power at the first destination; wherein a second source determines whether it has received the transmission from the first source, or the acknowledgement from the first destination, at a power level lower than that of the maximum permitted additional interference given in the indication; and whether the transmit power of the second source is lower than the transmit power at the first destination; and if so, the second source sends a transmission to a second destination, which at least partially overlaps in time, communication between the first source and first destination.

Preferably, the maximum permitted power that the second source is permitted to transmit is equal to the power level at which the second source has received the acknowledgement from the first destination subtracted from the transmit power at the first destination included in the acknowledgment plus the power level of the maximum permitted additional interference given in the indication; and wherein the second source transmits at, or below the permitted maximum power, if sufficient, or refrains from transmitting, if not.

Preferably, the method further comprises determining from the acknowledgement an indication of maximum permitted additional interference at the first source and sending a further transmission from the first source to the first destination including an indication of the maximum permitted additional interference at the first source and the transmit power at the first source; and comparing the transmit power of the second source and the first source and only sending a transmission to the second destination if the transmit power of the second source is lower.

Preferably, the maximum permitted power that the second source is permitted to transmit is equal to the power level at which the second source has received the transmission from the first source subtracted from the transmit power at the first source included in the acknowledgment plus the power level of the maximum permitted additional interference given in the indication; and wherein the second source transmits at, or below the permitted maximum power, if sufficient, or refrains from transmitting, if not.

Although raw data can be sent in the indication, such as received signal strength, or bit rate, or estimated protection ratio of the received signal from which the maximum permitted additional interference can be calculated, preferably, the maximum permitted additional interference at a source, or destination is calculated at that source or destination and sent in the indication.

Preferably, if the second destination determines that it has received the transmission from the first source, or the acknowledgment from the first destination, at a power level higher than that of the maximum permitted additional interference given in the indication, then the second destination does not acknowledge the transmission from the second source; and in the absence of this acknowledgement, the second source does not send a transmission to the second destination, which at least partially overlaps in time, communication between the first source and the first destination, but only transmits to the second destination if the channel is found clear.

Preferably, the second source continues to only transmit if the channel is found clear until a set number of data units have been sent.

If a response failure is detected in the first transmission between the second source and the second destination, then the second source disables TARB operation for a fixed number of data units being transmitted.

In accordance with a second aspect of the present invention, a method of obtaining an opportunity to transmit in a system operating a method according to any preceding claim comprises determining in a third source, the number of data units which have been timed out for transmission within a predetermined time frame; comparing this with a threshold number of data units; if the threshold has been exceeded, listening for an acknowledgement from another communicating source or destination; calculating from the acknowledgment, a number of message fragments remaining in that communication; and scheduling a transmission from the third source to that source or destination to be sent at the end of the transmission of the message fragments; wherein the scheduled transmission from the third source instructs the communicating source or destination to cease transmissions which at least partially overlap in time, transmissions between another source and destination.

By determining when transmissions cease and scheduling a message to stop TARB transmissions at this point, the third source is able to interrupt the communication at the other source, so that the third source can take advantage of TARB transmissions itself.

Preferably, an expected time of transmission from the first source or first destination is determined and a window of time is set about this expected time, during which detection by the second source or the second destination of a start of a signal is ignored in determining whether transmissions, which at least partially overlap in time with communication between the first source and first destination, are permitted.

When a channel is being shared, a time window is set up around the expected time of a transmission from the first source and destination, so that this can be ignored by the second source and destination in deciding whether or not they are safe to continue spectrum sharing.

Preferably, a carrier sense multiple access random backoff of any source or destination terminal is modified to exclude transmission starts within the window.

Random backoffs of a terminal operating the method of the present invention are adjusted so that no terminal transmits in a time slot covered by the window.

BRIEF DESCRIPTION OF THE DRAWINGS

An example of a method of transmission according to the present invention will now be described with reference to the accompanying drawings in which:

FIG. 3 illustrates an example of transmissions in the scenario of FIG. 1 and their effect on one another;

FIG. 4 shows an ongoing data transmission, which is being observed by one or more terminals;

FIG. 5 illustrates an alternative to the example of FIG. 4; and,

FIG. 6 shows how lock-out can occur when operating the method of the present invention.

DETAILED DESCRIPTION OF THE PREFERRED EMBODIMENT

Figure 1:
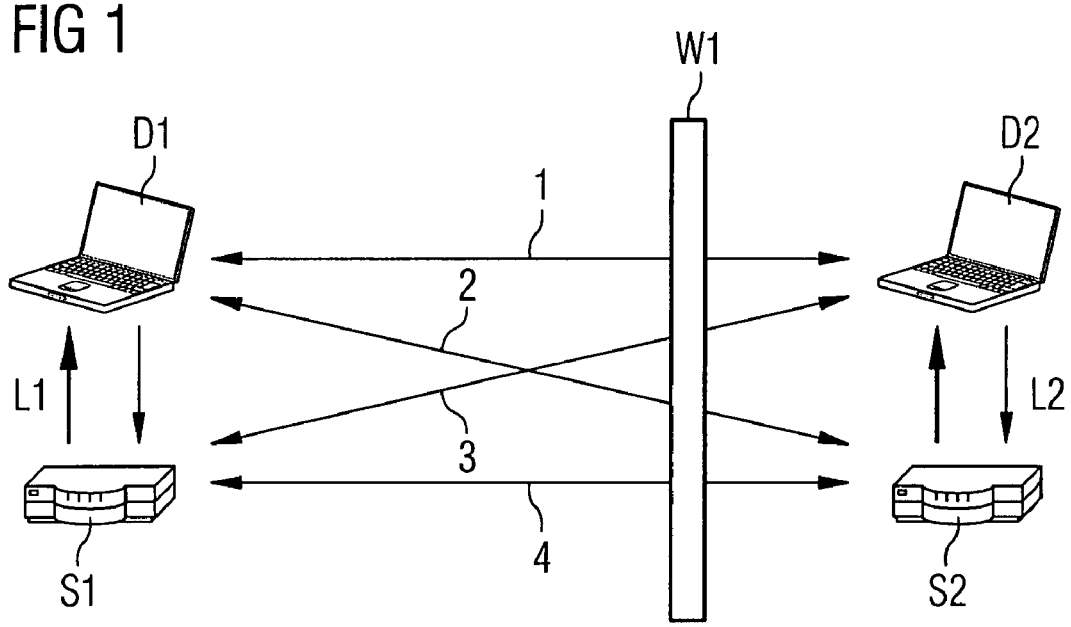
FIG. 1 shows a first scenario for the method of the present invention, with two pairs of communicating terminals.

In FIG. 1, an example is shown of how using transmitters as receiver beacons (TARB) allows at least two links to operate simultaneously when the respective link ranges are short and the interference paths are weak. A first source S1 and a first destination D1 are communicating across a first link L1 and S1 is sending data, or a request to send (RTS) message and receiving acknowledgments or a clear to send (CTS) message from D1. In the vicinity is another pair of devices, second source S2 and second destination D2, which also wish to communicate in a similar fashion across a second link L2. Between each pair of devices D1, D2; D1, S2; S1, D2; S1, S2, there are interference paths 1, 2, 3, 4.

Figure 2:
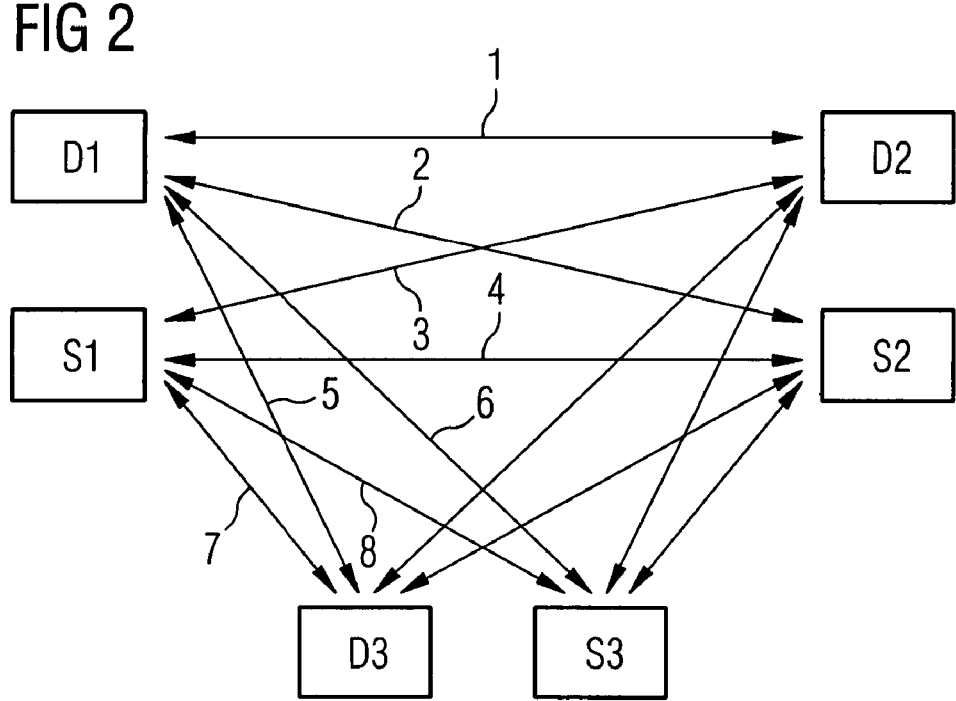
FIG. 2 shows a second scenario for the method of the present invention, with more than two pairs of communicating terminals.

An example might be the situation where there are two adjacent homes, both operating WiFi, with WiFi links that are short range, with a relatively long interference range and the interfering signals also have to pass through one or more walls W1. It is clear that, with such a scenario, it might be possible for both links to operate simultaneously with acceptable mutual interference. The problem with normal CSMA is that, if the interference paths are detectable, it is not possible to identify when such sharing is possible. If the mutual interference ranges remained roughly the same, but the wanted link ranges increased, such sharing would no longer be possible, but it would not be possible to determine this. The present invention is able to automatically identify scenarios such as that of FIG. 1 and allow sharing wherever possible. This is not limited to two pairs of devices, but can be used to allow further pairs of devices to determine whether or not they can start communications in the presence of an existing data flow, as illustrated in FIG. 2. This shows an additional source and destination S3, D3 which are present within interference range, with additional interference paths 5, 6, 7, 8 between D1, D3; D1, S3; S1, D3; and S1, S3. Similarly, additional interference paths are present between D2, S2 and D3, S3.

CSMA only involves listening to transmitters so it is not possible to identify problems at receivers. The TARB concept of the present invention involves the transmitter and receiver terminals making reception measurements and embodying this information into their transmissions.

The operation of the present invention is based on the incorporation of an additional set of fields conveying new control information. The information includes the maximum permitted additional interference level (MPIL) given the interference received, or raw data allowing the MPIL to be calculated. The MPIL is inferred by measurement of the received signal strength for the wanted signal, knowledge of the required signal to interference for the bit rate being used and knowledge of the typical receiver noise floor. If the received signal strength indication (RSSI) is transmitted instead of the MPIL, it is necessary also to transmit a representation of the received bit rate, so that the recipient can compute the MPIL, although this gives rise to an increase in the data overhead. However, arranging for the recipient to compute the MPIL allows for receiver-specific evaluation of the necessary protection ratios.

The operation of the present invention is described with respect to FIG. 3. S1 sends a data packet, or fragment 10 to D1 and this transmission 11 is also heard by S2 and D2, but contains no information of value to them. Next D1 acknowledges 12 the packet from S1. In the acknowledgement from D1 data is included that states the maximum permitted additional interference level, given the power with which D1 received the data packet 10. S2 and D2 also hear this transmission 13. This time S2 and D2 process the information in that transmission as follows. S2 and D2 measure the power with which they received the acknowledgement transmission 13. On the basis of reciprocity and the fact that all terminals transmit the same power, the power level that they received from D1 is the same as the power that D1 would receive if D2, or S2 transmitted. Thus, if the received power is less than the MPIL, acceptable interference will result. On the basis of this test, S2 and D2 separately determine whether they could transmit without causing unacceptable interference to D1. This is not enough, however, since S2 and D2 must also avoid interfering unduly with S1, since S1 must be able to hear the acknowledgements. Thus, S2 and D2 listen for S1's next data transmission 14, which now includes its own MPIL. S2 and D2 perform the same test on the received transmission 15. In the example shown, all four tests pass. Thus, S2 is allowed to transmit data even whilst S1 and/or D1 are transmitting, so S2 transmits first data 16 to D2 and the process continues with further bursts. Thus, the radio channel is re-used over the period 40 indicated for shared use of the channel. D1 sends another acknowledgement 17 to S1 and S1 sends further data 18 to D1, which is duly acknowledged 19. D2 sends an acknowledgement 41 to S2.

After S1 has completed its three fragment exchange with D1, S1 must also apply the method of the present invention to see whether it can now transmit whilst S2, or D2 are transmitting. This happens in exactly the same way as before, so D2 sends further data 20 which is acknowledged 21 by S2 and the transmission 22 is heard by D1 and S1. Similarly, S2 sends further data 23 and that transmission 42 is heard by D1 and S1. If, in both cases, S1 and D1 determine that they will not interfere with S2 and D2, then S1 can transmit again.

It is necessary to determine the ability to share with both ends of the other link. As seen in FIG. 3, this can be done by listening to data received from both ends of the other link, which includes the indications required to operate the TARB method, hereinafter referred to as TARB data. However, listening to TARB data from both ends is not essential. Instead, having received TARB data from one end of the link, it is also possible to determine when to expect the start of the response (a data burst following an acknowledgement (Ack) or clear to send (CTS), and an Ack following a data burst). All that is necessary is to detect the start of the response—i.e. the initial sync burst and measure its power. From reciprocity and the use of equal transmit powers, it is possible to infer that the MPIL will be the same for both ends of the link (assuming use of the same bit rate). Thus, measurement of received power from the far end is sufficient to perform the test. If nothing at all is detected then, by definition, the test is passed. If a signal from a different terminal at a stronger level is detected then the test will fail, but it would not have been possible to demodulate the TARB field anyway.

The TARB sharing state applies after a TARB field with MPIL greater than the RSSI has been received for one end of a link and after the other end of the link has either been measured with RSSI lower than that MPIL, or if nothing has been detected at the expected time.

The TARB sharing state at any given terminal continues until the start of another transmission has been detected (including a transmission from that terminal). However, it is not desirable to lose TARB sharing if the new transmission is a further part of the data exchange that is being shared with. In order to avoid this possibility, a detect window 44 is set around the expected time 45 of the predicted start of the next element of the ongoing data exchange. Moreover, there may be excluded numbers in the CSMA collision window so that another signal cannot start up at this time. This situation is illustrated in FIG. 4.

FIG. 4 shows an ongoing data exchange 29 in which TARB data 24 is transmitted, which includes an indication of MPIL 30, first received at a possible sharing terminal at instant 31. One, or more other terminal(s) may be observing the transmissions and the operations at a possible sharing terminal are indicated in the area 46. Assuming the first TARB data 24 is received and that the received power is less than the encoded MPIL, then a further delay occurs before detection 32 of a second signal with a TARB indication 33 for the return signal (in the case of FIG. 4, an ACK 25), after which TARB sharing is available. When the second signal has been received, and assuming that its received level was below the previously decoded MPIL, the recipient is now in a position to transmit. However, this is now the classic CSMA situation where more than one terminal may have observed the channel to be usable given the TARB data and these terminals need to contend for it. They operate according to the CSMA protocol as shown. Each potential sharing transmitter first waits to see the channel clear (as modified by the TARB mode) for a period of the distributed coordination function inter frame space (DIFS) time 26, followed by a randomly determined number of time slots 43. There is a missing transmit time 27, included such that no terminal can start transmitting at the same time as the next data burst 28 of the ongoing data exchange. Thus, it is safe to ignore this transmission start up when looking for possible contention. As stated earlier, the TARB sharing state stops as soon as a transmission (other than the ongoing data burst) starts up.

A particular terminal that starts transmitting will complete its burst even though the TARB sharing state no longer applies. Moreover, except under particular circumstances, ACKs or CTSs can be transmitted from the far end, even though that end, by now, will almost certainly also not be in a TARB sharing state. Following receipt of an ACK, or CTS the source can continue with the exchange. Thus, the data exchange can be completed overall with as many data fragments as required using TARB sharing (provided no packets are lost), even though the TARB sharing state was cleared at the start of the exchange. This approach removes the need to transmit duration data in the TARB field and maximises flexibility of TARB operation.

Frequently the detection of TARB state arises as shown in FIG. 5. In this case the ACK 25 is detected first. This is more likely to happen because interference makes detection of the whole of a data burst unlikely. Thus, it is most likely that a data exchange 29 will finish during the transmission of a data burst on the shared link and that the TARB in this burst will not be detected. Therefore, the sharer needs to wait quietly for reception of the ACK 25 before it can confirm that it is safe to share with this link.

For a TARB sharing exchange to be successful it is necessary that both ends of the sharing link be able to operate with acceptable interference to both ends of the shared-with link. Referring to FIG. 3 again, two tests are performed for permitted TARB sharing at both S2 and D2, and in this example, both tests were successful. However, suppose that both tests at S2 were successful, but that one or both of the tests at D2 were not. S2 does not know that D2 will be unable to acknowledge its transmission, so S2 transmits data anyway.

If the destination has determined that it cannot use TARB for sharing then it only acknowledges receipt of the data, or replies to a request to send (RTS) with a CTS if the channel is found clear. This applies if the transmission had been made using TARB based sharing, so TARB fields need to contain a bit that indicates whether TARB sharing had been used in order to make the transmission.

In general this does not happen often. In fact, if the destination is unable to reply to the source because it would interfere with ongoing transmissions, then it is likely that the destination will not actually hear the source because of interference from those ongoing transmissions. Either way, the source will not usually get a reply. This state of affairs is undesirable since the source now waits for TARB transmissions from the ongoing data exchange in order to re-enter the TARB sharing state and then sends a repeat transmission. This will also not receive a reply and the situation is repeated with ongoing wasted efforts.

The solution to this problem is to detect response failure for a first transmission and then disable TARB for all transmissions to that particular destination. However, this is still inefficient because it means that every time a TARB sharing attempt is made to transmit a medium access control (MAC) layer service data unit (MSDU) to that destination, the first transmission (RTS if RTS/CTS is active, or data otherwise) plus the response timeout period is wasted. This waste can be reduced by disabling TARB for a fixed number of MSDUs following response failure.

From the above it can be seen that the TARB field needs to contain the MPIL and a single bit indicating whether TARB sharing has been used for the current transmission. Allowing a 64 dB dynamic range and 1 dB steps requires 6 bits for the MPIL, plus 1 bit for the sharing indicator.

A scenario has been identified in which the use of TARB can prevent a link from obtaining any opportunities for transmission, as shown in FIG. 6. Here, three links are seeking to operate, devices D1 and S1 on link 34, devices D2 and S2 on link 35 and devices D3 and S3 on link 36. The first and second links 34, 35 have a mutual separation 37 such that they can use TARB to allow simultaneous operation of their links. However, the third link 36 is situated between these links 34, 35 in such a location that sharing 38, 39 using TARB is not possible with either existing link 34, 35. If activity levels on the first and second links 34, 35 are high (e.g. both are performing file transfer), then the third link 36 could see a channel that is 100% occupied, so neither end of the link 36 is ever permitted to transmit.

Clearly the possibility of such a situation is unacceptable. One potential solution is for the ends D3, S3 of link 3 to re-tune to another frequency. However, this is problematic given their inability to exchange any data to agree on a different frequency. The solution adopted here is to implement an 'Anti-TARB' message. The principles are as follows. A terminal that has data to send, but has had a number of MSDUs time out can transmit an anti-TARB. The timing of anti-TARB transmissions must be carefully chosen because they need to be received at the data sources and these can be transmitting for a high proportion of the time. Moreover, when they are not transmitting they can be receiving ACKs that effectively jam reception of the anti-TARB. Also it is only necessary or desirable that one of the links is prevented from using TARB. The principle is to listen for receipt of an ACK. Because of the way TARB operates and because of the need to receive the ACKs to confirm that TARB sharing can continue, as shown in FIG. 4, there is a window so that the locked out terminal is able to decode at least one ACK for every exchange. The ACK contains network allocation vector (NAV) information, the purpose of which is to inform any recipient of the period over which it needs to remain silent to allow reception of any following burst. In principle, this can be used to predict the end of the exchange in order to determine when the anti-TARB can be transmitted. In reality, the ACK only contains a flag conveying whether it acknowledged the last data fragment or not. In order to predict the end of the exchange, therefore, it is necessary for the TARB data to include a 'fragments left' field. For a maximum of 8 fragments, only 3 bits are needed for this. Thus, the locked out terminal schedules an anti-TARB message addressed to the destination for the ACK. There is unlikely to be a conflict between both ends of a locked out link attempting to transmit an anti-TARB at the same time since this would only happen if both suddenly had data to transmit at essentially the same time.

The anti-TARB is received by the addressed destination and a timer period is started, over the period of which TARB sharing is not permitted. This timer period is a compromise between loss of throughput for the locked out link when re-sending anti-TARBs on the one hand, and loss of TARB benefit when that link is either no longer present, or has nothing to transmit. A period of the order of 1 second is appropriate for current systems.

In dealing with interference from the destination, the second source may transmit data to the second destination contrary to normal carrier sense multiple access rules, provided that the second source has satisfied the requirements of the present invention. Furthermore, the second device may wait for a predicted period necessary to identify the start of a next anticipated data burst from the source station and to determine that this has been received below the maximum permitted additional interference level.

Similarly, in dealing with interference from the source, the second source may transmit data to the second destination contrary to normal carrier sense multiple access rules, provided that it has satisfied the requirements of the present invention. Furthermore, the second source may wait for a predicted period necessary to identify the start of the next anticipated acknowledgement transmission from the destination station and has to determine that this has been received below the maximum permitted interference level.

The MPIL indication may include an additional data bit indicating whether or not the current transmission was made contrary to normal carrier sense multiple access rules.

If the second destination has been performing any of the tests to determine whether it can transmit then, if the received data transmission carried an indication that it was made using spectrum sharing, then the second destination will only acknowledge transmission from the second source if either its own test succeeded, or if the channel was idle at the appointed acknowledgement time.

A time window may be established around the time at which the next transmission is anticipated from either of the first source or destination stations identified, such that detection of the start of a signal within this window is ignored for the purposes of ending the state of satisfaction of the criteria of the present invention, allowing shared use of a channel.

An adjustment can be made to the CSMA backoff procedure such that, if the selection of random backoff leads to a transmission schedule whose start falls within the window identified, then that random backoff is modified such that the schedule does not fall within the window A second source that has made a data transmission contrary to normal carrier sense multiple access rules, but has not received an acknowledgment within the anticipated period, logs this event and accumulates one or more such events to determine that the destination is unable, either to receive its data transmissions, or to acknowledge them, in such a way that when a specified number of such events has occurred then the source will establish a number of data exchanges for which it will not permit spectrum sharing according to the invention.

A source or destination that is unable to make any data transmissions over a number of data exchanges because of seeing the channel busy listens for an acknowledgement transmission and if the flag indicates that the acknowledgement transmission acknowledged a transmission made using spectrum sharing according to the invention, then it computes the anticipated end of the exchange using NAV data contained in the acknowledgement and additional data transmitted along with the further data indicating the number of further data fragments to be transmitted and schedules the transmission of a special burst, addressed to the intended recipient of the acknowledgement, the effect of reception of said special burst at the addressed destination being to set a timer, over the period of which, spectrum sharing according to the invention is disallowed.

If raw data is sent, then the receiving device can perform an estimate of the maximum permitted interference level, by making an assumption of the bit rate that had been used for the signal whose received signal strength had been measured based on previous observed activity, and using this in conjunction with a look up table of required protection ratios for various bit rates in conjunction with the signalled received signal strength.

Alternatively, the device receiving the data performs an estimate of the maximum permitted interference level, by making an assumption of the bit rate that had been used for the burst whose received signal strength had been measured based on having decoded the bit rate field for that burst, and using this in conjunction with a look up table of required protection ratios for various bit rates in conjunction with the signalled received signal strength.

In another option, the device receiving the data performs an estimate of the maximum permitted interference level, using the bit rate that had been signalled in conjunction with a look up table of required protection ratios for various bit rates in conjunction with the signalled received signal strength.

Alternatively, the device receiving the data performs an estimate of the maximum permitted interference level, using the signalled required protection ratio in conjunction with the signalled received signal strength.

The data may be transmitted within one or more added OFDM symbols at fixed bit rate within a modulation format that is OFDM based for the normal data. In this case, the OFDM symbol(s) is(are) transmitted immediately after the long-sync field, consisting of two known OFDM symbols defined in 802.11a/g and immediately before the signal field that carries the subsequent bit rate and burst length information as defined in 802.11a/g.

Alternatively, the OFDM symbol(s) is(are) transmitted immediately after the signal field that carries the subsequent bit rate and burst length information as defined in 802.11a/g and before the MAC burst; or the OFDM symbol(s) is(are) transmitted immediately after the MAC burst of an 802.11a/g signal.

The invention claimed is:

1. A method of transmission, the method comprising receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference; wherein a second source determines whether it has received the transmission from the first source, or the acknowledgement from the first destination, at a power level lower than that of the maximum permitted additional interference given in the indication; and if so, the second source sends a transmission to a second destination, which at least partially overlaps in time, communication between the first source and first destination, wherein an indication of the transmit power at the first destination is included in the acknowledgement, wherein the maximum permitted power that the second source is permitted to transmit is equal to the power level at which the second source has received the acknowledgement from the first destination subtracted from the transmit power at the first destination included in the acknowledgment plus the power level of the maximum permitted additional interference given in the indication.

2. A method according to claim 1, wherein the method further comprises determining from the acknowledgement an indication of maximum permitted additional interference at the first source and sending a further transmission from the first source to the first destination including an indication of the maximum permitted additional interference at the first source.

3. A method according to claim 2, wherein the second source compares the power level of each received transmission containing an indication with the level of maximum permitted additional interference indicated in that transmission in order to determine whether or not to send an at least partially overlapping transmission to the second destination.

4. A method according to claim 2, wherein the maximum permitted additional interference at a source, or destination is calculated at that source, or destination and sent in the indication.

5. A method according to claim 1, wherein the transmission from the first source comprises a Request to Send message.

6. A method according to claim 1, wherein the acknowledgement from the first destination comprises a Clear to Send message.

7. A method according to claim 1, wherein the maximum permitted additional interference at the first destination is determined from at least one of signal strength of the transmission, data rate of the transmission; and signal to interference ratio of the first destination.

8. A method according to claim 1, wherein the sources and destinations comprise transceivers.

9. A method according to claim 1, wherein the indication is included in data of the acknowledgement.

10. A method of transmission, the method comprising receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference; wherein a second source determines whether it has received the transmission from the first source, or the acknowledgement from the first destination, at a power level lower than that of the maximum permitted additional interference given in the indication; and if so, the second source sends a transmission to a second destination, which at least partially overlaps in time, communication between the first source and first destination, wherein an indication of the transmit power at the first source is included in the acknowledgement, wherein the maximum permitted power that the second source is permitted to transmit is equal to the power level at which the second source has received the transmission from the first source subtracted from the transmit power at the first source included in the acknowledgment plus the power level of the maximum permitted additional interference given in the indication.

11. A method according to claim 10, wherein the method further comprises determining from the acknowledgement an indication of maximum permitted additional interference at the first source and sending a further transmission from the first source to the first destination including an indication of the maximum permitted additional interference at the first source.

12. A method according to claim 11, wherein the second source compares the power level of each received transmission containing an indication with the level of maximum permitted additional interference indicated in that transmission in order to determine whether or not to send an at least partially overlapping transmission to the second destination.

13. A method according to claim 10, wherein the transmission from the first source comprises a Request to Send message.

14. A method according to claim 10, wherein the acknowledgement from the first destination comprises a Clear to Send message.

15. A method according to claim 10, wherein the maximum permitted additional interference at the first destination is determined from at least one of signal strength of the transmission, data rate of the transmission; and signal to interference ratio of the first destination.

16. A method according to claim 10, wherein the sources and destinations comprise transceivers.

17. A method according to claim 10, wherein the indication is included in data of the acknowledgement.

18. A method of transmission, the method comprising receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference and the transmit power at the first destination; wherein a second source determines whether it has received the transmission from the first source, or the acknowledgement from the first destination, at a power level lower than that of the maximum permitted additional interference given in the indication; and whether the transmit power of the second source is lower than the transmit power at the first destination; and if so, the second source sends a transmission to a second destination, which at least partially overlaps in time, communication between the first source and first destination, wherein the maximum permitted power that the second source is permitted to transmit is equal to the power level at which the second source has received the acknowledgement from the first destination subtracted from the transmit power at the first destination included in the acknowledgment plus the power level of the maximum permitted additional interference given in the indication.

19. A method according to claim 18, wherein the method further comprises determining from the acknowledgement an indication of maximum permitted additional interference at the first source and sending a further transmission from the first source to the first destination including an indication of the maximum permitted additional interference at the first source and the transmit power at the first source; and comparing the transmit power of the second source and the first source and only sending a transmission to the second destination if the transmit power of the second source is lower.

20. A method of transmission, the method comprising receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference and the transmit power at the first destination; wherein a second source determines whether it has received the transmission from the first source, or the acknowledgement from the first destination, at a power level lower than that of the maximum permitted additional interference given in the indication; and whether the transmit power of the second source is lower than the transmit power at the first destination; and if so, the second source sends a transmission to a second destination, which at least partially overlaps in time, communication between the first source and first destination, wherein the method further comprises determining from the acknowledgement an indication of maximum permitted additional interference at the first source and sending a further transmission from the first source to the first destination including an indication of the maximum permitted additional interference at the first source and the transmit power at the first source; and comparing the transmit power of the second source and the first source and only sending a transmission to the second destination if the transmit power of the second source is lower, wherein the maximum permitted power that the second source is permitted to transmit is equal to the power level at which the second source has received the transmission from the first source subtracted from the transmit power at the first source included in the acknowledgment plus the power level of the maximum permitted additional interference given in the indication.

21. A method of transmission, the method comprising receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference; wherein a second source determines whether it has received the transmission from the first source, or the acknowledgement from the first destination, at a power level lower than that of the maximum permitted additional interference given in the indication; and if so, the second source sends a transmission to a second destination, which at least partially overlaps in time, communication between the first source and first destination, wherein if the second destination determines that it has received the transmission from the first source, or the acknowledgment from the first destination, at a power level higher than that of the maximum permitted additional interference given in the indication, then the second destination does not acknowledge the transmission from the second source; and in the absence of this acknowledgement, the second source does not send a transmission to the second destination, which at least partially overlaps in time, communication between the first source and the first destination, but only transmits to the second destination if the channel is found clear.

22. A method according to claim 21, wherein the second source continues to only transmit if the channel is found clear until a set number of data units have been sent.

23. A method of obtaining an opportunity to transmit in a system operating a method comprising receiving at a first destination, a transmission from a first source; determining from the transmission from the first source, the maximum permitted additional interference subject to which the first destination can still communicate; sending an acknowledgement of the transmission and including in the acknowledgement an indication of the determined maximum permitted additional interference; wherein a second source determines whether it has received the transmission from the first source, or the acknowledgement from the first destination, at a power level lower than that of the maximum permitted additional interference given in the indication; and if so, the second source sends a transmission to a second destination, which at least partially overlaps in time, communication between the first source and first destination; the method comprising determining in a third source, the number of data units which have been timed out for transmission within a predetermined time frame; comparing this with a threshold number of data units; if the threshold has been exceeded, listening for an acknowledgement from another communicating source or destination; calculating from the acknowledgment, a number of message fragments remaining in that communication; and scheduling a transmission from the third source to that source or destination to be sent at the end of the transmission of the message fragments; wherein the scheduled transmission from the third source instructs the communicating source or destination to cease transmissions which at least partially overlap in time, transmissions between another source and destination.

24. A method according to claim 23, wherein the method further comprises determining from the acknowledgement an indication of maximum permitted additional interference at the first source and sending a further transmission from the first source to the first destination including an indication of the maximum permitted additional interference at the first source.

25. A method according to claim 23, wherein the maximum permitted additional interference at the first destination is determined from at least one of signal strength of the transmission, data rate of the transmission; and signal to interference ratio of the first destination.

* * * * *